United States Patent [19]

Gutierrez-Rubio

[11] Patent Number: 4,580,967

[45] Date of Patent: Apr. 8, 1986

[54] MACHINE FOR OBTAINING SPHERICAL BODIES FROM JELLIFIABLE LIQUIDS

[75] Inventor: Joaquin Gutierrez-Rubio, Seville, Spain

[73] Assignee: Sociedad Anonima de Racionalization y Mechanization (Sadrym), Seville, Spain

[21] Appl. No.: 692,224

[22] Filed: Jan. 17, 1985

[30] Foreign Application Priority Data

Sep. 12, 1984 [ES] Spain ........................... 281,434

[51] Int. Cl.$^4$ .......................... B01J 2/04; B29C 3/00
[52] U.S. Cl. .......................... 425/311; 425/8; 425/10; 425/292; 264/5; 264/13; 264/142
[58] Field of Search ............... 425/6, 8, 10, 292, 296, 425/308, 310, 311; 264/5, 13, 14, 140, 141, 142

[56] References Cited

U.S. PATENT DOCUMENTS

| | | | |
|---|---|---|---|
| 1,951,790 | 3/1934 | Curran | 264/13 |
| 2,652,007 | 9/1953 | Meakin | 425/310 X |
| 2,700,941 | 2/1955 | Johnson | 425/310 X |
| 2,931,067 | 4/1960 | Delaloye et al. | 264/14 |
| 3,323,166 | 6/1967 | Ross | 425/8 |
| 3,414,640 | 12/1968 | Garetto et al. | 425/10 X |
| 3,719,732 | 3/1973 | Diffenbach et al. | 264/13 X |
| 4,154,379 | 5/1979 | Schermutski | 264/13 X |
| 4,290,989 | 9/1981 | Topor et al. | 425/308 X |
| 4,296,061 | 10/1981 | Buckingham | 425/308 X |
| 4,300,877 | 11/1981 | Andersen | 425/311 X |
| 4,422,372 | 12/1983 | Hoezee | 425/311 X |
| 4,470,791 | 9/1984 | Tanaka et al. | 425/311 |

Primary Examiner—J. Howard Flint, Jr.
Attorney, Agent, or Firm—Cushman, Darby & Cushman

[57] ABSTRACT

A machine is provided for forming a supply of jellifiable fluid into jelled spherical droplets by pouring that fluid out of a housing through nozzles while intersecting the path of the fluid with knives rotating in a horizontal plane on a rotated axle. Valves for the nozzles and the rotational speed of the axle are subject to adjustment. A mechanical arrangement is provided for holding all of the valves open to a desired degree against a closing force provided by springs. A jellifying agent is fed through the axle and out onto the knives so that jellification begins to occur immediately as the jellifiable fluid is cut into segments by the rotating knives.

6 Claims, 3 Drawing Figures

MACHINE FOR OBTAINING SPHERICAL BODIES FROM JELLIFIABLE LIQUIDS

This invention relates to a machine which has been specially designed to obtain spherical bodies from a jellifiable liquid product.

The method of making a jellifiable liquid flow with a given viscosity is, in itself known, letting it fall, drop by drop, on a liquid jellification medium, so that through the effect of superficial tension, these drops adopt a spherical configuration on falling, and said configuration acquires a stable nature on reaching the liquid jellifying medium, to which mention has been made above.

SUMMARY OF THE INVENTION

The machine which the invention provides, based on the known physical effect of the tendency towards a spherical configuration of a small portion of a liquid, through the effect of superficial tension, allows a considerably high operative cycle, and also enables the size of the spherical bodies to be obtained to be regulated as wished, obviously within limits established by the physical principle itself on which the method is founded.

The machine which the invention provides is made up of a chassis on which the respective housing is mounted, forming a supplier-distributor of the liquid or jellifiable mass from a tank. In the said chassis a circumferential alignment of nozzles is arranged for removing the said jellifiable mass, assisted by the respective plug valves to ensure the opening or closing of these nozzles as wished, i.e., their operative or inoperative position.

Special mention should be made of the fact that the said control valves of the outlet nozzles are adjustable, in order to allow the consequent regulation of the flow-rate of the jellifiable mass which flows outwards through the nozzles, thus regulating the speed of the machine's operative process, since, obviously, the greater the flowrate of jellifiable mass, the greater the number of spherical bodies obtained in the same time, through each of the nozzles.

As a complement to the structure disclosed, and in the central area of the chassis, with respect to the circumferencial alignment of the nozzles, a rotating axle is placed, duly insulated from the housing forming the supplier-distributor for the jellifiable mass, axle whose shaft emerges at the bottom of the said chassis and, apart from incorporating the respective pulley receiving the movement, includes in its free end an arm-holder block, to which one or more radial arms are integrally joined, holding respective knives placed in an imaginary horizontal plane, coinciding with that of the outlet of the respective nozzles, so that the rotating movement of the axle involves a sequential cutting effect on the "jet" of jellifiable mass which flows through the said nozzles, so that the continuous cylnder of mass supplied by each nozzle is broken down into minute cylnders, whose length varies according to the rotating speed of the knife and said portions immediately adopting a spherical configuration, due to the superficial tension phenomenon.

In order to avoid the jellifiable mass sticking to the knives or to the edges of the nozzle, and also to ensure that the spherical forming of the jellifiable fluid starts immediately, and to assist the different portions or units coming away, it has been foreseen that the nozzles and knives be continually impregnated with a gellifying agent solution, and for this, the knife-holder arms have been so arranged that the said jellifying agent reaches them, leaving by the fixing area of the knife itself, and running along it lengthwise, until it reaches its cutting area and also spreading towards the nozzle outlet. To feed the said jellifying agent and due to the fact that the arm-holder is subject to a permanent rotating movement, it has been foreseen that an annular channel be made in the said arm-holder, in its coupling area to the drive shaft; radial ductings emerge from the said annular channel, corresponding to the different arms and which communicate with their hollow inside part.

This annular channel is linked, through a radial drill of the shaft, to an axial duct made in the finished part, on a level with the chassis in another radial duct which in turn leads into a second annular channel made in the fixed part of the chassis in which the rotating axle is installed and which the jellifying agent reaches through the last duct, which is static, to which the said agent is supplied.

To complete the structure disclosed, and to work the machine, the existence has been foreseen of a disc with a broad central hole, coupled coaxially to the housing-supplier itself, and with which the valvular shanks of the different nozzles are linked, so that when the said disc rests on a stepping defined in the housing, the valves adopt the closed position, corresponding to the inoperative situation of the machine, whereas when the said disc rises, it drags the aforementioned valvular shanks with it, making the nozzles open, thereby regulating the valves, with the assistance of a nut and counternut set connected to each shank and which determines its relationship with the operating disc.

To assist this operation, it has been foreseen that the disc preferably includes two diametrically opposite radial arms and has recesses in its central hole, which may or may not be opposite the respective pivots, emerging at the side of the housing, and acting as retention elements for the disc in the operative position of the machine. Hence, the said disc must be turned slightly, for which purpose the holes linking the disc and the valvular shanks are quite slanting with respect to the imaginary circumferential line corresponding to the location of the valves.

From the foregoing, it can be deduced that the machine which the invention proposes is specially suitable for obtaining spherical bodies or balls of products such as sweets, obtained from a jellifiable product, but without there being practically any limitation to the type of product to be obtained, provided one starts from a jellifiable mass capable of adopting a spherical configuration through the effect of superficial tension.

BRIEF DESCRIPTION OF THE DRAWINGS

To complete the description being made and in order to assist a better understanding of the features of the invention, a set of drawings is attached to this Specification, as an integral part thereof, in which the following has been shown, with an illustrative and unlimiting nature.

DETAILED DESCRIPTION

The machine which the invention provides is made up of a fixed platform or chassis 1, preferably circular, in whose periphery a circumferential alignment of nozzles 2 is arranged, installed on the chassis 1 with the assistance of the respective valve housings 3, while at the top a housing 4, of revolution, is also coupled to the chassis 1, forming a supplier-distributor for the liquid or jellifiable mass, from which the spherical bodies constituting the final product are to be obtained.

Figure 1:
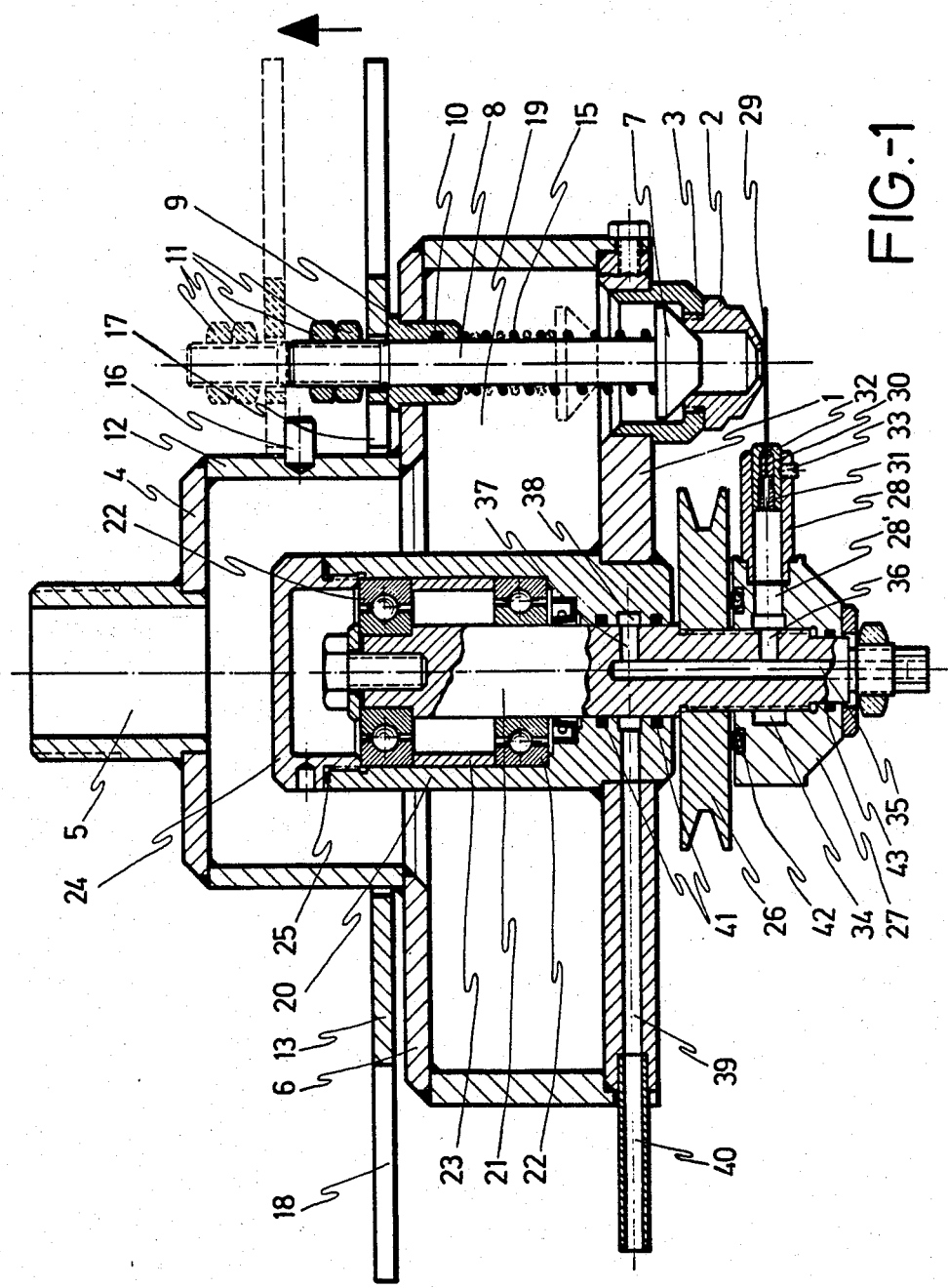
FIG. 1 shows a side elevation view in a diametrical cross-section of a machine for obtaining spherical bodies from jellifiable liquids, executed in accordance with the object of this invention, in which only one of the nozzles has been shown, with its respective valve, to simplify the drawing, said figure showing the two positions of the valve element in continuous and dotted lines, corresponding to the opening and closing of the nozzle.

An upper outlet 5 is formed in the housing, for access of the jellifiable mass and a middle stepping 6 on which respective valves 7 are placed with respect to the different nozzles 2; the said valves may be of the tapered front type, like the one shown in FIG. 1, or of any other type. Each of the said valves 7 is integrally joined to a vertical valvular shank 8, which crosses the stepping 6 of the housing, with the assistance of a guide 9 and of the respective sealing joint 10, and which at its free end has a threaded sector on which a nut and counternut set 11 is arranged, designed to act as limit stops for the valvular shank 8 and consequently for the valve itself 7.

Figure 2:
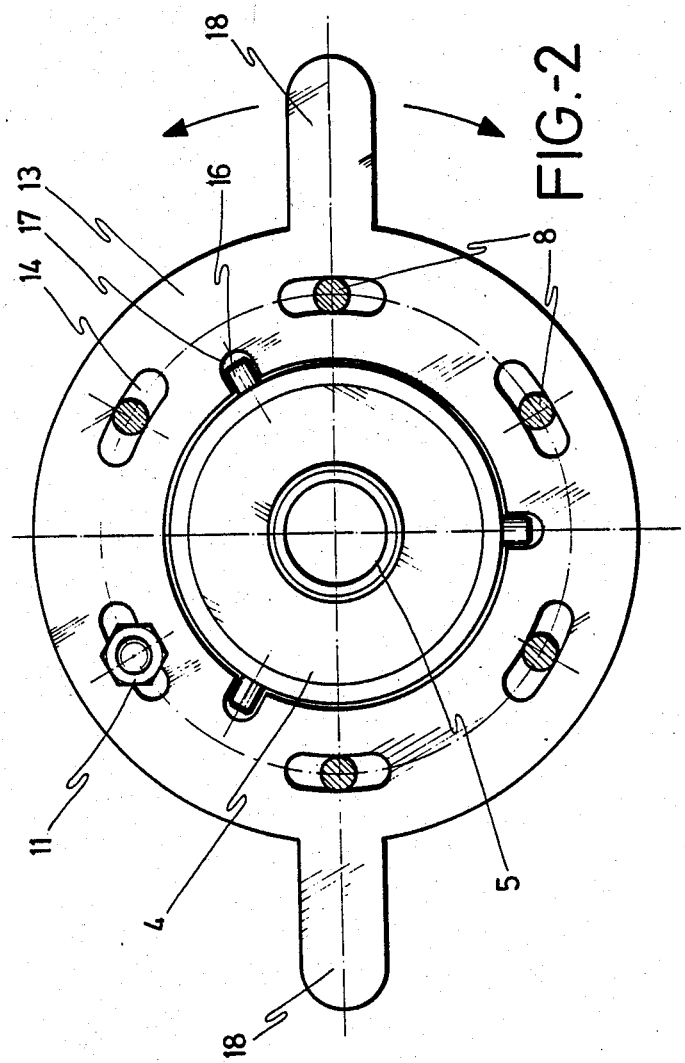
FIG. 2 shows a plan view of the machine illustrated in the previous figure.
Figure 3:
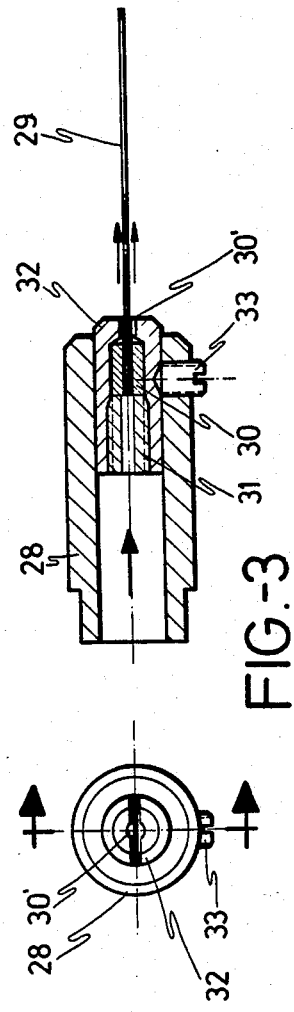
FIG. 3 finally shows an enlarged cross-section detail of one of the knife-holder arms.

A disc 13 is mounted on the top sector 12 of the smaller diameter housing, said disc being provided with a wide central hole corresponding to the diameter of the said sector 12, and being crossed by the shanks 8 through holes 14, slanting circumferentially, as can be seen in FIG. 2, to enable the disc to turn slightly. The position of the disc 13 determines the position of the valves 7, so that when the said disc rests on the stepping 6 of the housing, the valves are in the closed position, according to one of the two illustrations of FIG. 1, whereas when the disc 13 is raised, it drags the valvular shanks 8 against the tension of the respective springs 15, when these shanks are dragged by the "stops" formed by the nuts 11, until an open limit position defined by the stubs 16 which emerge radially from the sector 12 of the housing, and which allow the disc 13 to rise, thanks to the existence of notches 17 in the latter, corresponding to said pivots 16 and which, when the disc 13 is turned a little, thanks to the slanting configuration of the holes 14, they act as retention stops for the disc, thus preventing it lowering.

To assist manoeuvring the drive of the disc 13, it has been foreseen that the latter has radial extensions 18, preferably two in number and diametrically opposite, acting as arms or handles.

In accordance with the layout disclosed, between the chassis 1 and the housing 4 a chamber 19 is formed, containing the jellifiable mass, which remains closed when the disc 13 is in the lower position, or which opens through the multiple nozzles 2 when the said disc rises, establishing a flowrate through the said nozzles which varies according to the spacing between the valve heads 7 and their corresponding seats; this space can be regulated by adapting the respective nut and counternut sets 11.

This adjustable flowrate of jellifiable mass forms a continuous jet which must be "cut" to obtain portions which, through the effect of superficial tension, automatically acquire the spherical configuration sought.

To do so, a hollow central core 20 has been provided in the chassis 1, forming a housing for the rotating axle made up of a vertical shaft 21 and its respective bearings 22 linked through the spacer 23, said shaft emerging downwards with respect to the chassis 1, while at the top the core 20 is closed with a cover 24 which assists assembling the axle, the latter being sealed with respect to the chamber 19, with the aid of a gasket 25 fixed between the core 20 and the cover 24.

The said shaft 21, in its free end, includes a pulley 26 through which it is to receive the rotating movement from any drive source and also an arm-holder block 27, to which one or more arms 28 are associated radially, on which respective knives 29 are mounted, so that said knives, both whether it concerns only one or if there are several, are included in an imaginary horizontal plane passing through the pouring outlet of the nozzles 2, to produce the fragmentation sought for the jellifiable mass which leaves through these nozzles.

To avoid the said mass sticking to the knives 29 or to the outlet of the nozzles 2, and concomitantly to ensure that the final spherical formation of the jellifying fluid commences immediately, thereby helping the portions to come away, it has been provided that the nozzles and knives remain continually impregnated with a jellifying agent, such as a diatomic metal salt, as it has also been foreseen that the fluid is jellifiable due to the assistance of sodium alginate.

To achieve the impregnation of the knives 29, the arms 28 supporting them have been made hollow, and are fixed with the aid of a guide 30, made of two parts which grip the knife with the assistance of a screw 31, but with the particularity that these parts have grooves 30' in their sides adapted to the knife, which form a path for the jellifying agent from inside the hollow of the arm and through the screw 31 itself which is also hollow. The assembly formed by the guide 30 for the knives 29, and the screw 31 is housed in a knife-holder 32 which is fixed to the arm 28 with the aid of a setscrew 33.

To ensure that the jellifying agent reaches the knives which are driven by a rotating movement, the armholder block 27 has been made to include an inner annular channel 34, from which ductings 28' emerge towards the respective arms 28, as can also be seen in FIG. 1, said annular channel 34 being closed by the actual shaft 21 and communicating with an axial duct 35 thereof, through a radial hole 36 made in the axle 21, with relation to the aforesaid channel 34.

In turn, the axial duct 35, with the assistance of another radial hole 37 of the shaft 21, communicates with the core 20 through a second perimetral groove 38 made in the said core 20, around the shaft 21 and in a position corresponding to the chassis 1, said channel 38 finally communicating with the outside through a duct 39 made in the actual chassis and finished in a coupling duct 40 through which the jellifying agent is fed.

To establish the suitable degree of airtightness for this multiple canalization, the existence has been provided of joints 41 which seal the channel 38, as well as of joints 42 and 43 which seal the lower channel 34.

In accordance with the foregoing, the knives 29 which in their rotating movement are at a tangent with the pouring outlet of the nozzles 2, are permanently impregnated with jellifying fluid and transfer the said fluid to the actual jellifiable mass during cutting, at the same time as they also impregnate the nozzle itself.

According to the flowrate of jellifiable mass which leaves through each nozzle 2 and to the sequential cutting speed of the knives 29, portions of jellifiable mass will be obtained of different volume, which will lead to spherical bodies also of variable dimensions, at the discretion of the operator of the machine.

It is not considered necessary to make this description any more lengthy for an expert on the subject to understand the scope of the invention and the advantages derived from it.

The materials, shape, size and layout of the elements will be liable to variation, provided this does not involve altering the essential nature of the invention.

The terms in which this Specification has been drawn up should always be taken in their broadest and unlimiting sense.

After disclosing the object of this invention, it is declared that what constitutes its essence is specified in the following claims:

I claim:

1. A machine for obtaining spherical bodies from a jellifiable liquid, comprising:
    a housing adapted for receiving a mass of jellifiable fluid from a container tank;
    said housing having a base provided with a plurality of paving nozzles arranged in a circumferential array of aligned nozzles having respective outlets adapted to permit continuous jets of said jellifiable fluid to pour out of said housing therefrom;
    valve means incorporated between said housing and said nozzles for adjusting volumetric flow rate of jellifiable fluid from said outlets;
    a knife means including at least one knife secured to a rotatable axle and arranged closely under said outlets of said nozzles so as to be in position to cut said jellifiable fluid, when such is pouring in continuous jets from said nozzle outlets, into individual segments;
    said axle being arranged to be rotated at a variable speed, so that by a combination of adjusting said valve means and varying the rotational speed of said axle, the volume of jellifiable fluid in each individual segment may be adjusted; and
    means for supplying a jellifying agent to said jellifiable fluid via said at least one knife as said at least one knife cuts said continuous jets of jellifiable fluid into segments, in order to prevent sticking of the jellifiable fluid to the nozzles and knife means and in order to ensure that formation of the jellifiable fluid into spheres begins immediately as said jets thereof leave said nozzles.

2. The machine of claim 1 wherein:
    said housing is defined by wall means of generally discoidal shape, including a smaller diameter disk-shaped upper end wall, a larger diameter disk-shaped lower end wall, and a generally cylindrical sidewall which undergoes a transition in diameter at an annular upwardly-facing shoulder located intermediate said end walls;
    said nozzles being mounted to said lower end wall so that the outlets thereof are disposed externally of said lower end wall;
    said valve means including individual valve seats provided for said nozzles internally of said housing, valve members mounted on generally vertically-oriented valve stems mounted for movement axially into and from sealing engagement with said valve seats, said valve stems sealingly protruding upwardly from within said housing through said annular shoulder, whereby said valves may be adjusted in degree of openness by axially moving said valve shanks from outside said housing.

3. The machine of claim 2, further including:
    a drive ring coaxially arranged on said housing about said sidewall above said annular shoulder;
    each valve shank extending through a respective opening provided in said drive ring;
    a height-adjustable stop secured on each valve shank above said drive ring so that the amount which said drive ring may be lifted before said valve shanks are lifted may be adjusted; and
    spring means effectively acting between said valve members and said housing for tending to hold said valve members closed against said valve seats unless said drive ring is lifted sufficiently to lift said valve stems.

4. The machine of claim 3, further including:
    at least one pin protruding radially outwardly from said housing sidewall above said annular shoulder;
    a corresponding at least one radially inwardly opening notch formed on said drive ring on the inner perimeter thereof;
    said openings through said drive ring being provided in the form of respective slots which are elongated angularly of said drive ring;
    said drive ring being thereby adapted to be angularly moved between:
        a first position in which said at least one pin is vertically aligned with said at least one slot, so that said drive ring if raised above said at least one pin and released will be returned below said at least one pin by recovery of said spring means, and
        a second position in which said at least one pin is vertically out of alignment with said at least one slot, so that to facilitate maintaining said valve means in an open condition, said drive ring may be raised above said at least one pin while disposed in said first position thereof, then rotated to said second position thereof and released so that said at least one pin supportingly engages said drive ring from below and thus holds said drive ring in an elevated condition.

5. The machine of claim 4, wherein:
    said axle emerges downwardly from said housing through a rotary bearing means provided on said lower end wall;
    pulley means secured on said axle below said lower end wall so that said axle may be rotated at a desired speed by driving said pulley at a corresponding rate; and
    said knife means includes a knife block mounted to said axle, with said at least one knife mounted thereto so as to extend radially outwardly therefrom.

6. The machine of claim 5, wherein:
    the means for supplying jellifying agent comprises a supply duct extending radially inwardly along said lower end wall of said housing, rotary bearing means and axle, then axially downwardly in said axle and radially outwardly through said knife block and along each said at least one knife.

* * * * *